(12) United States Patent
Pazhyannur et al.

(10) Patent No.: US 9,516,640 B2
(45) Date of Patent: Dec. 6, 2016

(54) SYSTEM AND METHOD FOR A MEDIA ACCESS CONTROL SCHEDULER FOR A LONG TERM EVOLUTION UNLICENSED NETWORK ENVIRONMENT

(71) Applicant: CISCO TECHNOLOGY, INC., San Jose, CA (US)

(72) Inventors: Rajesh S. Pazhyannur, Fremont, CA (US); Vikram Chandrasekhar, Mountain View, CA (US); Ahmadreza Hedayat, Allen, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 59 days.

(21) Appl. No.: 14/450,040

(22) Filed: Aug. 1, 2014

(65) Prior Publication Data

US 2016/0037490 A1 Feb. 4, 2016

(51) Int. Cl.
*H04B 7/185* (2006.01)
*H04W 4/00* (2009.01)
(Continued)

(52) U.S. Cl.
CPC .......... *H04W 72/042* (2013.01); *H04W 16/14* (2013.01); *H04W 72/0446* (2013.01);
(Continued)

(58) Field of Classification Search
CPC .... H04W 16/14; H04W 72/005; H04W 72/04; H04W 72/0446; H04W 72/048; H04W 72/12; H04W 72/121; H04W 72/1215; H04W 74/04; H04W 74/0808; H04W 74/0816; H04W 76/025; H04W 76/026; H04W 84/12; H04W 88/08; H04W 88/10; H04W 28/0221; H04W 28/048; H04W 52/143; H04W 72/00; H04W 72/042; H04W 72/0453; H04W 72/0473; H04W 72/082; H04W 74/08; H04L 5/003; H04L 41/12; H04J 3/14; H04J 3/16; H04J 3/1694
(Continued)

(56) References Cited

U.S. PATENT DOCUMENTS 6,483,820 B1  11/2002  Davidson et al.
7,379,739 B2   5/2008  Rajkotia et al.
(Continued)

FOREIGN PATENT DOCUMENTS

CN   102378288     3/2012
CN   105050072 A   11/2015
(Continued)

OTHER PUBLICATIONS

Adrangi, F., et al., "Chargeable User Identity," Network Working Group RFC 4372, Jan. 2006, 10 pages.
(Continued)

*Primary Examiner* — Tri H Phan
(74) *Attorney, Agent, or Firm* — Patent Capital Group

(57) ABSTRACT

An example method is provided in one example embodiment and may determining, by a first communication device, whether one or more other communication devices are communicating wireless signals in a particular channel of an unlicensed band of the communication network; scheduling one or more Long Term Evolution Unlicensed (LTE-U) sub-frames within a frame schedule for a user equipment (UE) based, at least in part, on determining that one or more communication devices are communicating wireless signals in the particular channel; and communicating the one or more LTE-U sub-frames to the UE according to the frame schedule.

19 Claims, 5 Drawing Sheets

(51) Int. Cl.
  *H04J 3/00* (2006.01)
  *H04J 4/00* (2006.01)
  *H04W 72/04* (2009.01)
  *H04W 16/14* (2009.01)
  *H04W 72/12* (2009.01)
  *H04W 74/08* (2009.01)

(52) U.S. Cl.
  CPC ... *H04W 72/0453* (2013.01); *H04W 72/1215* (2013.01); *H04W 74/0816* (2013.01)

(58) Field of Classification Search
  USPC .............. 370/310–350, 431, 436–437, 442, 468, 370/478; 455/450–464
  See application file for complete search history.

(56) References Cited

U.S. PATENT DOCUMENTS

| | | |
|---|---|---|
| 7,983,667 B2 | 7/2011 | Hart et al. |
| 8,107,950 B2 | 1/2012 | Amerijoo et al. |
| 8,320,965 B2 | 11/2012 | Kwun |
| 8,588,698 B2 | 11/2013 | Brisebois |
| 8,611,299 B2 | 12/2013 | Yang et al. |
| 8,639,243 B2 | 1/2014 | Radulescu et al. |
| 8,712,459 B2 | 4/2014 | Lim et al. |
| 8,792,886 B2 | 7/2014 | Meshkati |
| 8,830,936 B2 | 9/2014 | Ren |
| 8,917,658 B2 | 12/2014 | Bjork |
| 9,219,816 B2 | 12/2015 | Grayson et al. |
| 9,226,255 B2 | 12/2015 | Grayson et al. |
| 9,350,737 B2 | 5/2016 | Fernandez Alonso |
| 2005/0036462 A1 | 2/2005 | Sillasto et al. |
| 2006/0229087 A1 | 10/2006 | Davis et al. |
| 2007/0008885 A1 | 1/2007 | Bonner |
| 2009/0137246 A1 | 5/2009 | Xing |
| 2010/0056184 A1 | 3/2010 | Vakil |
| 2010/0112982 A1 | 5/2010 | Singh et al. |
| 2010/0124929 A1 | 5/2010 | Lee |
| 2010/0157922 A1 | 6/2010 | Kim et al. |
| 2010/0182955 A1 | 7/2010 | Bjork |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0279628 A1 | 11/2010 | Love et al. |
| 2011/0110316 A1 | 5/2011 | Chen et al. |
| 2011/0130144 A1 | 6/2011 | Schein |
| 2011/0170481 A1 | 7/2011 | Gomes |
| 2011/0177817 A1 | 7/2011 | Hole |
| 2011/0211514 A1 | 9/2011 | Hamalainin |
| 2012/0004003 A1 | 1/2012 | Shaheen et al. |
| 2012/0015653 A1 | 1/2012 | Paliwal |
| 2012/0100849 A1 | 4/2012 | Marsico |
| 2012/0129537 A1 | 5/2012 | Liu et al. |
| 2012/0191842 A1 | 7/2012 | Hu et al. |
| 2012/0258720 A1 | 10/2012 | Tinnakornsrisphap et al. |
| 2012/0260299 A1 | 10/2012 | Kotecha |
| 2012/0265888 A1 | 10/2012 | Roeland et al. |
| 2012/0276913 A1 | 11/2012 | Lim |
| 2012/0290452 A1 | 11/2012 | Pancorbo Marcos |
| 2012/0327850 A1 | 12/2012 | Wang et al. |
| 2013/0003697 A1 | 1/2013 | Adjakple et al. |
| 2013/0077482 A1 | 3/2013 | Krishna et al. |
| 2013/0132570 A1 | 5/2013 | Lopez Nieto |
| 2013/0136072 A1 | 5/2013 | Bachmann et al. |
| 2013/0155948 A1 | 6/2013 | Pinheiro |
| 2013/0163543 A1 | 6/2013 | Freda et al. |
| 2013/0182680 A1 | 7/2013 | Choi et al. |
| 2013/0229945 A1 | 9/2013 | Cha et al. |
| 2013/0235759 A1 | 9/2013 | Meshkati |
| 2013/0294356 A1 | 11/2013 | Bala et al. |
| 2013/0308531 A1 | 11/2013 | So et al. |
| 2013/0326001 A1 | 12/2013 | Jorgensen et al. |
| 2013/0337769 A1 | 12/2013 | Bhatia |
| 2013/0337821 A1 | 12/2013 | Clegg |
| 2013/0339783 A1 | 12/2013 | Alonso et al. |
| 2013/0343288 A1 | 12/2013 | Ratasuk et al. |
| 2013/0343304 A1 | 12/2013 | Kaippallimalil et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0016629 A1 | 1/2014 | Pancorbo Marcos |
| 2014/0078986 A1 | 3/2014 | Kaippallimalil et al. |
| 2014/0086226 A1 | 3/2014 | Zhao et al. |
| 2014/0094139 A1 | 4/2014 | Xu |
| 2014/0112251 A1 | 4/2014 | Kim et al. |
| 2014/0126453 A1 | 5/2014 | Park |
| 2014/0146732 A1 | 5/2014 | Olufunmilola et al. |
| 2014/0155109 A1 | 6/2014 | Vaidya et al. |
| 2014/0177583 A1 | 6/2014 | Aso |
| 2014/0241316 A1 | 8/2014 | Okmyanskiy et al. |
| 2014/0254367 A1 | 9/2014 | Jeong |
| 2014/0287759 A1 | 9/2014 | Purohit |
| 2014/0287769 A1* | 9/2014 | Taori ............... H04W 74/0808 455/450 |
| 2014/0297888 A1 | 10/2014 | McCann |
| 2014/0301351 A1* | 10/2014 | Gao ................. H04W 74/08 370/329 |
| 2014/0307589 A1 | 10/2014 | Li |
| 2014/0321328 A1 | 10/2014 | Zuniga |
| 2014/0342745 A1* | 11/2014 | Bhushan .............. H04L 5/005 455/450 |
| 2014/0378131 A1 | 12/2014 | Rui |
| 2015/0009826 A1 | 1/2015 | Ma |
| 2015/0044989 A1 | 2/2015 | De Foy |
| 2015/0055588 A1* | 2/2015 | Yerramalli ........ H04W 72/0446 370/329 |
| 2015/0146594 A1 | 5/2015 | Grayson |
| 2015/0200760 A1* | 7/2015 | Xia .................... H04L 1/00 370/252 |
| 2015/0222634 A1 | 8/2015 | Ludwig |
| 2015/0264652 A1* | 9/2015 | Zhang ................. H04W 52/143 455/522 |
| 2015/0296516 A1* | 10/2015 | Jung .................... H04W 72/02 370/312 |
| 2015/0365931 A1* | 12/2015 | Ng ..................... H04L 1/1812 370/329 |
| 2016/0007170 A1 | 1/2016 | Vaidya et al. |
| 2016/0007316 A1 | 1/2016 | Vaidya et al. |
| 2016/0007378 A1* | 1/2016 | Bertorelle .......... H04W 74/006 370/329 |
| 2016/0037550 A1* | 2/2016 | Barabell ............. H04B 17/318 455/450 |
| 2016/0073282 A1 | 3/2016 | Speicher |
| 2016/0073283 A1 | 3/2016 | Grayson |
| 2016/0073285 A1 | 3/2016 | Graham |
| 2016/0099794 A1* | 4/2016 | Chendamarai Kannan ............... H04B 17/345 370/329 |
| 2016/0127137 A1 | 5/2016 | Fernandez Alonso |
| 2016/0134761 A1 | 5/2016 | Campbell et al. |
| 2016/0135143 A1* | 5/2016 | Won ................... H04W 72/005 370/312 |
| 2016/0165494 A1 | 6/2016 | Warburton et al. |
| 2016/0226669 A1 | 8/2016 | Livanos et al. |
| 2016/0227428 A1* | 8/2016 | Novlan ................. H04W 24/10 |
| 2016/0234706 A1* | 8/2016 | Liu ........................ H04L 5/00 |
| 2016/0234763 A1* | 8/2016 | Um ..................... H04W 72/042 |

FOREIGN PATENT DOCUMENTS

| | | |
|---|---|---|
| CN | 105307279 | 2/2016 |
| CN | 105407509 | 3/2016 |
| CN | 105407540 | 3/2016 |
| CN | 105592460 | 5/2016 |
| EP | 2234422 | 9/2010 |
| EP | 2453700 | 5/2012 |
| EP | 2466831 | 6/2012 |
| EP | 2757850 | 7/2014 |
| EP | 298119 | 2/2016 |
| EP | 2993868 | 3/2016 |
| EP | 2996386 | 3/2016 |
| EP | 3029988 | 6/2016 |
| EP | 3046386 | 7/2016 |

(56) References Cited

FOREIGN PATENT DOCUMENTS

| | | |
|---|---|---|
| WO | WO 2009/025601 | 2/2009 |
| WO | WO 2011/002958 | 1/2011 |
| WO | WO 2011/085238 | 7/2011 |
| WO | WO 2011/134529 | 11/2011 |
| WO | WO 2012/055984 | 5/2012 |
| WO | WO 2012/135121 | 10/2012 |
| WO | WO 2013/041574 | 3/2013 |
| WO | WO 2013/082245 | 6/2013 |
| WO | WO2013/086659 | 6/2013 |
| WO | WO2013/169991 | 11/2013 |
| WO | WO 2014/051606 | 4/2014 |
| WO | WO 2014/177208 | 11/2014 |
| WO | WO 2016/126413 | 8/2016 |
| WO | WO 2016/126414 | 8/2016 |

OTHER PUBLICATIONS

"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.

"Paging Channel Selection," UMTS World; first published on or about Jun. 22, 2003; 3 pages http://www.umtsworld.com/technology/paging.html.

Holbrook, H., et al., "Source-Specific-Multicast for IP," Network Working Group RFC 4607, Aug. 2006.

Tayal, "All About PDCCH and CCE Allocation—PDCCH (Physical downlink Control Channel)," Tayal's Way to Learn LTE, May 2013; 14 pages http://nitintayal-lte-tutorials.blogspot.com/2013/03/all-about-pdcch-and-ccc-allocation.html.

"PDCCH Processing," published by Gio Zakradze on Dec. 29, 2014; 56 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex-France, Jun. 2010; See Section 4, pp. 15-46.

"ETSI TS 123 402 V9.8.0 (Mar. 2011) Technical Specification: Universal Mobile Telecommunications System (UMTS); LTE; Architecture enhancements for non-3GPP accesses (3GPP TS 23.402 version 9.8.0 Release 9)," ETSI, 650 Route des Lucioles, F-06921, Sophia Antipolis Cedex-France, Mar. 2011; See Section 4-6, pp. 14-116.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex-France, Jul. 2014.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex-France, Jul. 2014.

"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.

"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex-France, Sep. 2014.

"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex-France, Jun. 2014; See Sections 1-5, pp. 11-76.

"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex-France, Nov. 2014.

"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.

"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.

"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex-France, Jul. 2014; Section 4, pp. 17-88.

"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex-France, May 2014, 64 pages.

"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.

"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.

"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.

"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.

"GSMA LTE Roaming Guidelines, Version 9.0," GSM Association, Official Document IR88, Jan. 24, 2013; 53 pages.

Guttman, E., et al., "Service Location Protocol, Version 2," Network Working Group RFC 2608, Jun. 1999, 57 pages.

(56) References Cited

OTHER PUBLICATIONS

U.S. Appl. No. 14/534,792, filed Nov. 6, 2014, entitled "System and Method for Providing Message Delivery and Paging to a Group of Users in a Network Environment," Inventors: Maulik Vijay Vaidya, et al.
U.S. Appl. No. 14/480,284, filed Sep. 8, 2014, entitled "System and Method for Internet Protocol Version-Based Multiple Access Point Name Support in a Network Environment," Inventors: Mark Grayson, et al.
U.S. Appl. No. 14/481,654, filed Sep. 9, 2014, entitled "System and Method for Supporting Cell Updates Within Small Cell Cluster for Mobility in Cell Paging Channel Mode," Inventors: Mickael Graham, et al.
U.S. Appl. No. 14/536,642, filed Nov. 9, 2014, entitled "System and Method for Radio Aware Traffic Management Based Wireless Authorization," Inventors: Ian McDowell Campbell, et al.
U.S. Appl. No. 14/534,883, filed Nov. 6, 2014, entitled "System and Method for Providing Message Delivery and Paging to a Group of Users in a Network Environment," Inventors: Maulik Vijay Vaidya, et al.
U.S. Appl. No. 14/612,794, filed Feb. 3, 2015, entitled "System and Method for Providing Collaborative Neighbor Management in a Network Environment," Inventors: Nigel Edward Warbuton, et al.
U.S. Appl. No. 14/597,036, filed Jan. 14, 2015, entitled "System and Method for Providing Collision-Avoided Physical Downlink Control Channel Resource Allocation in a Network Environment," Inventors: Qing Zhao, et al.
U.S. Appl. No. 14/612,827, filed Feb. 3, 2015, entitled "System and Method for Providing Policy Charging and Rules Function Discovery in a Network Environment," Inventors: Konstantin Livanos, et al.
U.S. Appl. No. 14/614,500, filed Feb. 5, 2015, entitled "System and Method for Providing Policy Charging and Rules Function Discovery in a Network Environment," Inventors: Konstantin Livanos, et al.
U.S. Appl. No. 14/534,792.
U.S. Appl. No. 14/480,284.
U.S. Appl. No. 14/481,654.
U.S. Appl. No. 14/536,642.
U.S. Appl. No. 14/534,883.
U.S. Appl. No. 14/612,794.
U.S. Appl. No. 14/597,036.
U.S. Appl. No. 14/612,827.
U.S. Appl. No. 14/614,500.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 32.522 v11.2.0, 3rd Generation Partnership Project Technical Specification: Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
3GPP TSG-RAN WG3 #61bis, R3-081174, "Solution for interference reduction SON use case," Orange, Alcatel-Lucent, Agenda Item 10.1.1c; Kansas City, MO, USA; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex-France, Oct. 2014; 93 pages.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex-France, Sep. 2014; 308 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex-France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex-France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex-France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex-France, Oct. 2014; 64 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex-France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8 — 8.3.9 pp. 289292; §8.5.21 pp. 357-365; §10.2.7 pp. 620-623; Annex B.3 pp. 2045-2052].
"ETSI TS 125 469 V11.2.0 (Apr. 2013) Technical Specification: Universal Mobile Telecommunications System (UMTS); UTRAN Iuh interface Home Node B (HNB) Application Part (HNBAP) signaling (3GPP TS 25.469 version 11.2.0 Release 11)," ©European Telecommunications Standards Institute 2013; Apr. 2013; 78 pages.
"ETSI TS 125 469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," ©European Telecommunications Standards Institute 2010; Oct. 2010; 64 pages.
"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.
"ETSI TS 125 367 V9.4.0, Universal Mobile Telecommunications System (UMTS); Mobility procedures for Home Node B (HNB); Overall description; Stage 2 (3GPP T525.367 version 9.4.0 Release 9)", European Telecommunications Standards Institute, 650 Route des Lucioles, F06921 Sophia Antipolis Cedex, France, Jun. 2010; 17 pages.

(56) References Cited

OTHER PUBLICATIONS

"LTE Quick Reference: CCE Index Calculation," LTE Handbook, Share Technote, http://www.sharetechnote.com/html/Handbook_LTE_CCE+Index.html First Published on or about Jul. 8, 2012.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html;.
"Broadband Forum Technical Report: TR-196 Femto Access Point Service Data Model," Issue: 1, Issue Date: Apr. 2009, ©The Broadband Forum; 131 pages.
Broadband Forum, "TR-069 CPE WAN Management Protocol," Broadband Forum Technical Report, Issue: 1 Amendment 4, Issue Date: Jul. 2011, Protocol Version 1.3, ©The Broadband Forum. All Rights Reserved; 190 pages.
Broadband Forum, "TR-196 Femto Access Point Service Data Model," Broadband Forum Technical Report, Issue 2, Issue Date: Nov. 2011, ©The Broadband Forum. All Rights Reserved; 46 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Extensible Authentication Protocol," Wikipedia, the free encyclopedia, Sep. 16, 2013, 10 pages http://en.wikipedia.org/wiki/Extensible_Authentication_Protocol#EAP-FAST.
"Link Layer Discovery Protocol," Wikipedia, the free encyclopedia, Sep. 25, 2013, 4 pages, http://en.wikipedia.org/wiki/Link_Layer$_{13}$ Discovery_Protocol.
"Radius," Wikipedia, the free encyclopedia, Sep. 26, 2013, 12 pages http://en.wikipedia.org/wiki/RADIUS.
Ashraf, Imran, "Distributed Radio Coverage Optimization in Enterprise Femtocell Networks," International Conference on Communications ICC 2010, May 23-27, 2010, Cape Town, South Africa; 6 pages.
Calhoun, P., "Diameter Base Protocol," Network Working Group RFC 3588, Sep. 2003; 147 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Droms, R., "Dynamic Host Configuration Protocol," Network Working Group RFC 2131, Mar. 1997; 45 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Horn, Gavin, "3GPP Femtocells: Architecture and Protocols," Qualcomm Incorporated, 5775 Morehouse Drive, San Diego, CA, Sep. 2010; 64 pages.
Leung, K., et al., "WiMAX Forum/3GPP2 Proxy Mobile IPv4," Independent Submission RFC 5563, Feb. 2010; 41 pages.
Narten, T., et al., "Neighbor Discovery for IP version 6 (IPv6)," Network Working Group RFC 4861, Sep. 2007; 97 pages.
Nivaggioli, Patrice, "Cisco Small Cell Architecture," Cisco Connect, Dubrovnik, Croatia, South East Europe, May 20-22, 2013, ©2012 Cisco and/or its affiliates. All Rights Reserved.; 40 pages.
Saad, Sawsan A., et al., "A Survey on Power Control Techniques in Femtocell Networks," Journal of Communications vol. 8, No. 12, Dec. 2013; 10 pages.
EPO Dec. 15, 2015 Extended Search Report and Written Opinion from European Application Serial No. 15178914.6.
Ratasuk, Rapeepat, et al., "License-exempt LTE Deployment in Heterogeneous Network," 2012 International Symposium on Wireless Communications Systems (ISWCS), Aug. 28, 2012, pp. 246-250.
Almeida, Erika, et al., "Enabling LTE/Wifi Coexistence by LTE Blank Subframe Allocation," 2013 IEEE International Conference on Communications (ICC), Jun. 9, 2013, pp. 5083-5088.
EPO Feb. 8, 2016 Extended Search Report and Written Opinion from European Application Serial No. 15183583.2.
3GPP TSG-RAN WG3 Meeting #73bis R3-112481, "Issues Related to Cell RACH Support for HNB Handover," Alcatel-Lucent, 3GPP Draft, Zhuhai, China, Oct. 10-14, 2011; 10 pages.
3GPP TSG-RAN3 Meeting #69 R3-102094, "Text Proposal for HNBRAP," Alcatel-Lucent, 3GPP Draft, Madrid, Spain, Aug. 23-27, 2010; 62 pages.
EPO Jan. 29, 2016 Extended Search Report and Written Opinion from European Application Serial No. 15180616.
Gundavelli, M., et al., "Multiple APN Support for Trusted Wireless LAN Access," NETEXT-WG Internet Draft, draft-gundavelli-netext-multiple-apn-pmipv6-01.txt, Feb. 22, 2012; 15 pages.
"3GPP TS 23.402 V12.5.0 (Jun. 2014) Technical Specification: 3rd Generation Partnership Project; Technical Specification Group Services and System Aspects; Architecture enhancements for non-3GPP accesses (Release 12);" 3GPP, 650 Route des Lucioles; F-05921 Sophia-Antipolis Cedex, France; Jun. 2014; 291 pages.
SA-WG2 Meeting #92, S2-123194 (Revision of Sw-122735), Juniper Networks, Barcelona, Spain, Jul. 9-13, 2012; 13 pages.
EPO Mar. 11, 2016 Extended Search Report and Written Opinion from European Application Serial No. 15193713.
"3GPP TS 23.203 V7.3.0 (Jun. 1, 2007) Technical Specification: 3rd Generation Partnership Project; Group Services and System Aspects; Policy and charging control architecture (Release 7)," 3GPP, 650 Route des Lucioles; F-05921 Sophia-Antipolis Cedex, France; Jun. 1, 2007.
PCT Apr. 6, 2016 International Search Report and Written Opinion of the International Searching Authority from International Application No. PCT/US2016/013931.
"3GPP TS 29.213 V13.0.0 (Jan. 5, 2015) Technical Specification: 3rd Generation Partnership Project; Technical Specification Group Core Network and Terminals; Policy and Charging Control signalling flows and Quality of Service (QoS) parameter mapping (Release 13)," 3GPP, 650 Route des Lucioles; F-05921 Sophia-Antipolis Cedex, France; Jan. 5, 2015.
PCT Apr. 6, 2016 International Search Report and Written Opinion of the International Searching Authority from International Application No. PCT/US2016/013934.
3GPP TSG-CT WG3 Meeting #80, C3-150092, 29.213 CR0593, 3GPP Draft; Current Version 13.0.0; Huawei, et al.; Sorrento, Italy Feb. 2-6, 2015.
EPO Apr. 28, 2016 Extended Search Report and Written Opinion from European Application Serial No. 15195895.
EPO Jun. 7, 2016 Extended Search Report and Written Opinion from European Application Serial No. 16150351.
"Cisco ASR 5000 Series Small Cell Gateway," Cisco White Paper, C11-711704-00, Jul. 2012, Cisco Systems, Inc., Printed in USA, ©2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
3GPP TS 32.522 v11.2.0, "3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

* cited by examiner

SYSTEM AND METHOD FOR A MEDIA ACCESS CONTROL SCHEDULER FOR A LONG TERM EVOLUTION UNLICENSED NETWORK ENVIRONMENT

TECHNICAL FIELD

This disclosure relates in general to the field of communications and, more particularly, to a system and method for a Media Access Control (MAC) Scheduler for a Long Term Evolution Unlicensed (LTE-U) network environment.

BACKGROUND

Networking architectures have grown increasingly complex in communication environments. Mobile communication networks have grown substantially in subscriber base as end users become increasingly connected to mobile wireless environments. As the number of mobile subscribers increases, efficient management of communication resources becomes more critical. In some instances, network service providers desire to offload certain mobile communications to unlicensed frequency bands, such as LTE-U, in order to reduce congestion in a network or in some cases to provide differentiated services to subscribers. However, there are significant challenges in managing access to LTE-U, particularly in the context of sharing the LTE-U frequency band with other wireless devices and wireless access points operating in the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1A:
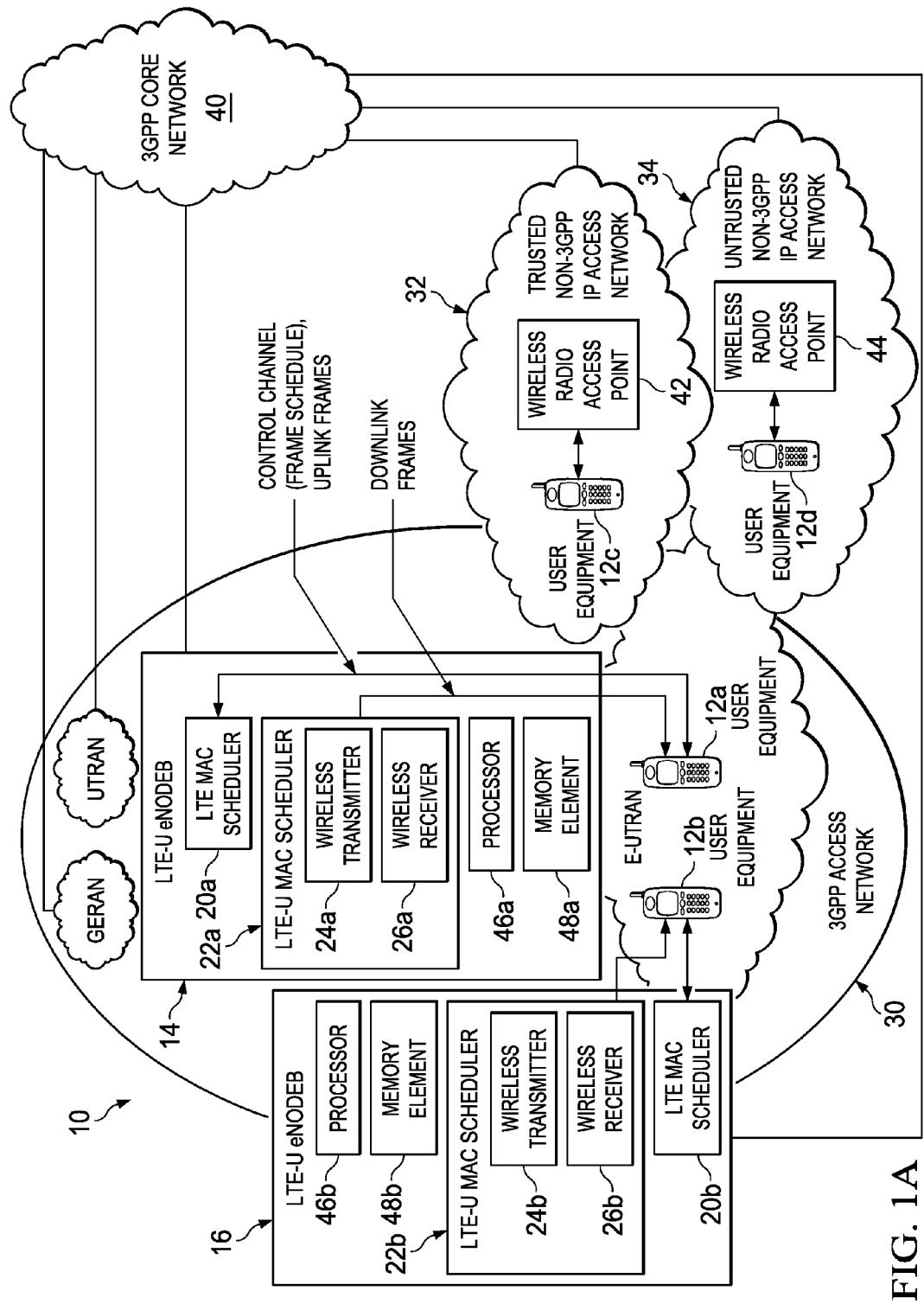
FIG. 1A is a simplified block diagram illustrating a communication system to facilitate MAC frame scheduling in an LTE-U network environment according to one embodiment of the present disclosure.

A method for a communication network is provided in one example embodiment and may include determining, by a first communication device, whether one or more other communication devices are communicating wireless signals in a particular channel of an unlicensed band of the communication network; scheduling one or more Long Term Evolution Unlicensed (LTE-U) sub-frames within a frame schedule for a user equipment (UE) based, at least in part, on determining that one or more communication devices are communicating wireless signals in the particular channel; and communicating the one or more LTE-U sub-frames to the UE according to the frame schedule. In some cases, the frame schedule can further include one or more zero-power sub-frames. In some cases, the one or more LTE-U sub-frames can be LTE-U downlink frames for the UE.

In some instances, the determining can include at least one of: implementing physical carrier sense by the first communication device to detect wireless signals being transmitted by one or more other communication devices; decoding, by the first communication device, Request to Send (RTS) and Clear to Send (CTS) frames being transmitted by one or more other communication devices; and implementing virtual carrier sense by the first communication device to detect wireless signals being communicated by one or more other communication devices.

In some cases, the determining can be performed using a wireless receiver for a LTE-U Media Access Control (MAC) scheduler for the first communication device. In yet other cases, the physical carrier sense can include a Clear Channel Assessment (CCA) at one or more signal strength thresholds. In still other cases, the virtual carrier sense can include decoding a Duration Field and a Network Allocation Vector being transmitted by the one or more other communication devices.

In still other cases, the method can include transmitting, by the first communication device, Clear to Send-to-self (CTS-to-self) frames including a Duration Field and Network Allocation Vector (NAV) based on transmit opportunity (TXOP) prior to communicating the one or more LTE-U sub-frames to the UE. In yet other cases, the method can include implementing, by the first communication device, one or more random back-off mechanisms to prohibit communicating the LTE-U sub-frames to the UE including at least one of: a distributed coordination function (DCF) back-off mechanism; and an enhanced distributed channel access (EDCA) back-off mechanism.

In some instances, the first communication device can be at least one of: an LTE-U evolved Node B (eNodeB) including an LTE-U Media Access Control (MAC) scheduler, wherein the LTE-U eNodeB includes a wireless receiver and a wireless transmitter for the LTE-U MAC scheduler and includes an LTE MAC scheduler; and an LTE-U Access Point (AP) including an LTE-U MAC scheduler, wherein the LTE-U AP includes a wireless receiver and a wireless transmitter for the LTE-U MAC scheduler.

Example Embodiments

Turning to FIG. 1A, FIG. 1A is a simplified block diagram illustrating a communication system 10 to facilitate LTE-U MAC frame scheduling in an LTE-U network environment in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally.

The example architecture of FIG. 1A may include user equipment (UE) 12a-12d, a 3GPP access network 30 including LTE Unlicensed (LTE-U) evolved Node B (eNodeBs) 14, 16, a trusted non-3GPP Internet protocol (IP) access network 32 and an untrusted non-3GPP IP access network 34, each respectively including a wireless radio access point 42, 44 and a 3GPP core network 40. Note as referred to herein in this Specification, the term 'unlicensed' is used to refer to unlicensed communication frequency bands or spectrums that can be used for communication technologies such as WiFi, Bluetooth™, WiMAX, etc. LTE-U eNodeBs 14, 16 may each include a respective LTE Media Access Control (MAC) Scheduler 20a-20b, an LTE-U MAC scheduler 22a-22b, a processor 46a-46b and a memory element 48a-48b. LTE-U MAC scheduler 22a within LTE-U eNodeB 14 may additionally be configured to interface with a wireless transmitter 24a and a wireless receiver 26a. LTE-U MAC scheduler 22b may be configured to interface with a wireless transmitter 24b and a wireless receiver 26b.

Each of the elements of FIG. 1A may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In various embodiments, 3GPP access network 30 may include access networks such as a GSM EDGE radio access network (GERAN), a UMTS terrestrial radio access network (UTRAN), generally referred to as 3G, and/or a LTE access network such as evolved UTRAN (E-UTRAN), generally referred to as 4G or LTE/LTE-Advanced (LTE-A). The GERAN and UTRAN may interface with 3GPP core network 40 via one of more network elements such as, for example, one or more Node Bs (NodeBs), one or more Radio Network Controllers (RNCs), one or more Serving General Packet Radio Service (GPRS) Support Nodes (SGSNs) and one or more Gateway GPRS support nodes (GGSNs). These network elements are not shown in order to illustrate other features of communication system 10. LTE-U eNodeBs 14, 16 may be used to provide E-UTRAN coverage for 3GPP access network 30 and may interface with 3GPP core network 40 using, for example, one or more Mobility Management Entities (MMEs), one or more serving gateways (SGWs), one or more Packet Data Network (PDN) gateways (PGWs), etc. These network elements are also not shown in order to illustrate other features of communication system 10.

3GPP core network 40 may include other elements such as one or more Policy and Charging Rules Functions (PCRFs), one or more Authentication, Authorization and Accounting (AAA) elements, a Home Subscriber Server/Home Location Register (HSS/HLR), etc. to provide connectivity for UE 12a-12d to external PDNs, such as the Internet, to implement QoS on packet flows, to provide enhanced services to UE 12a-12d, stateful firewalls, Traffic Performance Optimization, etc. These elements are also not shown in order to illustrate other features of communication system 10.

LTE-U eNodeBs 14, 16 can offer suitable connectivity to one or more UE (e.g., UE 12a-12b) using any appropriate protocol or technique. For example, in addition to providing E-UTRAN coverage, LTE-U eNodeB 14 may also allow UEs (e.g., UE 12a) to connect to a wired network using wireless transmitter 24a and wireless receiver 26a configured for LTE-U MAC scheduler 22a. Similarly, LTE-U eNodeB 16 may also allow UEs (e.g., UE 12b to connect to a wired network using wireless transmitter 24b and wireless receiver 26b configured for LTE-U MAC scheduler 22b. Thus, LTE-U eNodeBs 14, 16 may offer wireless connectivity to one or more UEs using one or more wireless technologies such as WiFi, Bluetooth™, WiMAX, etc. and may offer cellular connectivity to one or more UEs using 4G/LTE/LTE-A, or any other appropriate standard. Note wireless transmitter 24a and wireless receiver 26a may be configured as included within LTE-U MAC scheduler 22a for LTE-U eNodeB 14 (as shown in FIG. 1A) or may be configured within LTE-U eNodeB 14 external to LTE-U MAC scheduler 22a and may interface with LTE-U MAC scheduler 22b. Similarly, wireless transmitter 24b and wireless receiver 26b may be configured as included within LTE-U MAC scheduler 22b for LTE-U eNodeB 16 (as shown in FIG. 1A) or may be configured within LTE-U eNodeB 14 external to LTE-U MAC scheduler 22a and may interface with LTE-U MAC scheduler 22b.

Non-3GPP IP access networks can be included in communication system 10 and can divided into trusted and untrusted segments such as trusted non-3GPP IP access network 32 and untrusted non-3GPP IP access network 34, respectively. Note trusted non-3GPP IP access network 32 may be interchangeably referred to herein in this Specification as a 'trusted IP access network' and untrusted non-3GPP IP access network 34 may be interchangeably referred to herein in this Specification as an 'untrusted IP access network'.

As shown in FIG. 1A, trusted IP access network 32 and untrusted IP access network 34 may each respectively include a wireless radio access point 42, 44. Wireless radio access point 42 may be in communication with UE 12c, to provide PDN connectivity for UE 12c to a PDN, such as the Internet. Wireless radio access point 44 may be in communication with UE 12d, to provide PDN connectivity for UE 12d to a PDN such as the Internet. Note the term 'wireless radio access point' may be referred to interchangeably in this Specification as 'wireless access points' (WAPs). In general, trusted IP access networks support mobility, policy and AAA interfaces to the EPC, whereas untrusted IP access networks do not. For trusted IP access network 32, a viable relationship can exist between a service provider and elements of the 3GPP core network. In contrast, access from untrusted access network 62 is managed via an evolved packet data gateway (ePDG) (not shown) to interface with the 3GPP core network.

Note trusted IP access network 32 including WAP 42 and untrusted IP access network 34 first including WAP 44 are provided in FIG. 1A for illustrative purposes only in order to illustrate certain features related to MAC frame scheduling as provided by various embodiments of communication system 10. It should be understood that any combination of non-3GPP trusted and/or untrusted IP access networks, WAPS, etc. as well as 3GPP access networks can be configured in communication system 10 and are clearly within the scope of the present disclosure. Additionally, it should be understood that 3GPP access networks and trusted/untrusted IP access networks can be partially or fully overlapping access networks (e.g., 3GPP access network 30, trusted non-3GPP IP access network 32 and/or untrusted non-3GPP IP access network 34 can have full or partial overlapping coverage areas).

Before detailing some of the operational aspects of FIG. 1A, it is important to understand common characteristics of LTE-U as generally operated in commercial architectures. The following foundation is offered earnestly for teaching purposes only and, therefore should not be construed in any way to limit the broad teachings of the present disclosure. The LTE-vendor community has proposed extending LTE into unlicensed spectrums with the technology referred to as LTE-U. In its first discussion, the proponents of the technology have suggested using an LTE MAC scheduler 'as-is' and applying it to unlicensed spectrum operations in countries where regulations would allow such behavior (such as the United States). However, there is a concern that using an existing LTE MAC scheduler within an LTE-U communication device (e.g., an LTE-U eNodeB or LTE-U AP) cannot be used for unlicensed communications 'as-is' because such a MAC may simply 'swamp-out' or overrun other wireless (e.g., WiFi) communication devices such as wireless access points or other neighboring LTE-U communication devices operating within a coverage area of a particular LTE-U communication device. Thus, there is consensus that LTE-U may include a modified MAC, which can account for co-existence and fair usage with other unlicensed technology communication devices such as WiFi, Bluetooth™, WiMAX, etc.

Key requirements for such a modified MAC for LTE-U can include the ability to meet regulatory requirements such as Listen-Before-Talk (LBT) and/or radar detection in certain frequency bands as well as ensuring fair usage of an unlicensed spectrum with other LTE-U users as well as other unlicensed technology users such as WiFi, Bluetooth™, WiMAX, etc.

In accordance with one embodiment, communication system 10 can overcome the aforementioned shortcomings (and others) by providing an LTE-U MAC scheduler for LTE-U supplemental downlink (SDL) frames. A given LTE-U MAC scheduler may rely on having a wireless receiver/transmitter (e.g., LTE-U eNodeB 14 including LTE-U MAC scheduler 22a having wireless transmitter 24a and wireless receiver 26a) to perform physical carrier sensing, virtual carrier sensing and/or hidden node detection in order to avoid collisions with other wireless communication devices (e.g., LTE-U eNodeB 16, WAPs 42, 44, etc.) operating in the unlicensed spectrum of communication system 10. For example, a given wireless receiver (e.g., wireless receiver 26a) can decode wireless (e.g., WiFi) headers, which can enable the receiver to go beyond carrier sensing at −62 dBm and may allow for decoding packets at −82 dBm at least, and likely up to −88 dBm. This, in turn, can enable an LTE-U communication device to prevent collisions with distant wireless transmitters, which may be sensed at signal levels below −62 dBm but above the wireless receiver sensitivity. Thus, the wireless receiver for an LTE-U communication device (e.g., LTE-U eNodeB 14) may be used to implement a form of multi-technology hidden node detection.

In various embodiments, the LTE-U MAC scheduler may also implement random back-off mechanisms such as distributed coordination function (DCF) back-off mechanisms and/or enhanced distributed channel access (EDCA) back-off mechanisms in order to share a given wireless channel fairly. In various embodiments, the LTE-U MAC scheduler can also implement wireless (e.g., WiFi) Clear to Send (CTS) or CTS-to-self frames prior to any LTE-U transmission to reduce chances of collision with other wireless communication devices operating in the unlicensed spectrum of communication system 10. By incorporating key aspects of wireless scheduling into the LTE-MAC scheduler, solutions provided by communication system 10 can ensure that LTE-U MAC scheduling can be implemented fairly and can co-exist with other unlicensed technologies such as WiFi, which uses similar CTS or CTS-to-self frames. Similar approaches can be used by potentially adopting similar frames in Bluetooth™, WiMAX, etc.

Having a wireless receiver in an LTE-U communication device can also enable detecting wireless access points and their corresponding bandwidths (e.g., 20/40/80/160 MHz) and may allow the LTE-U communication device to detect primary and secondary channels of 802.11ac APs. This, in turn, can help the LTE-U communication device to transmit in secondary channels over primary channels, which can improve the coexistence of 802.11ac APs and LTE-U communication devices if they share only secondary channels for communications with UEs rather than sharing a primary channel.

As shown in FIG. 1A, the frame schedule for downlink (DL) frames for UE 12a may be sent over LTE in a control channel using LTE MAC scheduler 20a. In LTE-U (with supplemental downlink (SDL)), all uplink frames may also sent over LTE in the control channel using LTE MAC scheduler 20a. LTE-U downlink sub-frames may be sent over LTE-U using LTE-U MAC scheduler 22a via wireless transmitter 24a. For the UE 12a frame schedule, it is assumed that the LTE-U frame and sub-frame structure may include Zero-Power sub-frames (ZPSF) and that the primary synchronization signal (PSS) and secondary synchronization signal (SSS) can be less frequent than in LTE. For example, with LTE, PSS and SSS are expected twice every frame. However, for LTE-U, it is assumed that synchronization can be sent less frequently. In various embodiments, this may include sending synchronization signals (e.g., PSS and SSS) sent every 100 msec (e.g., the typical frequency of WiFi beacons). This may allow LTE-U eNodeB 14 to be completely silent (e.g., zero power) for relatively long periods of time. Note that LTE defines almost blank sub-frames (ABSF), which are not zero power as they contain cell-specific reference signals (CRS). Thus, it is further assumed that CRS may not be sent for LTE-U.

Figure 1B:
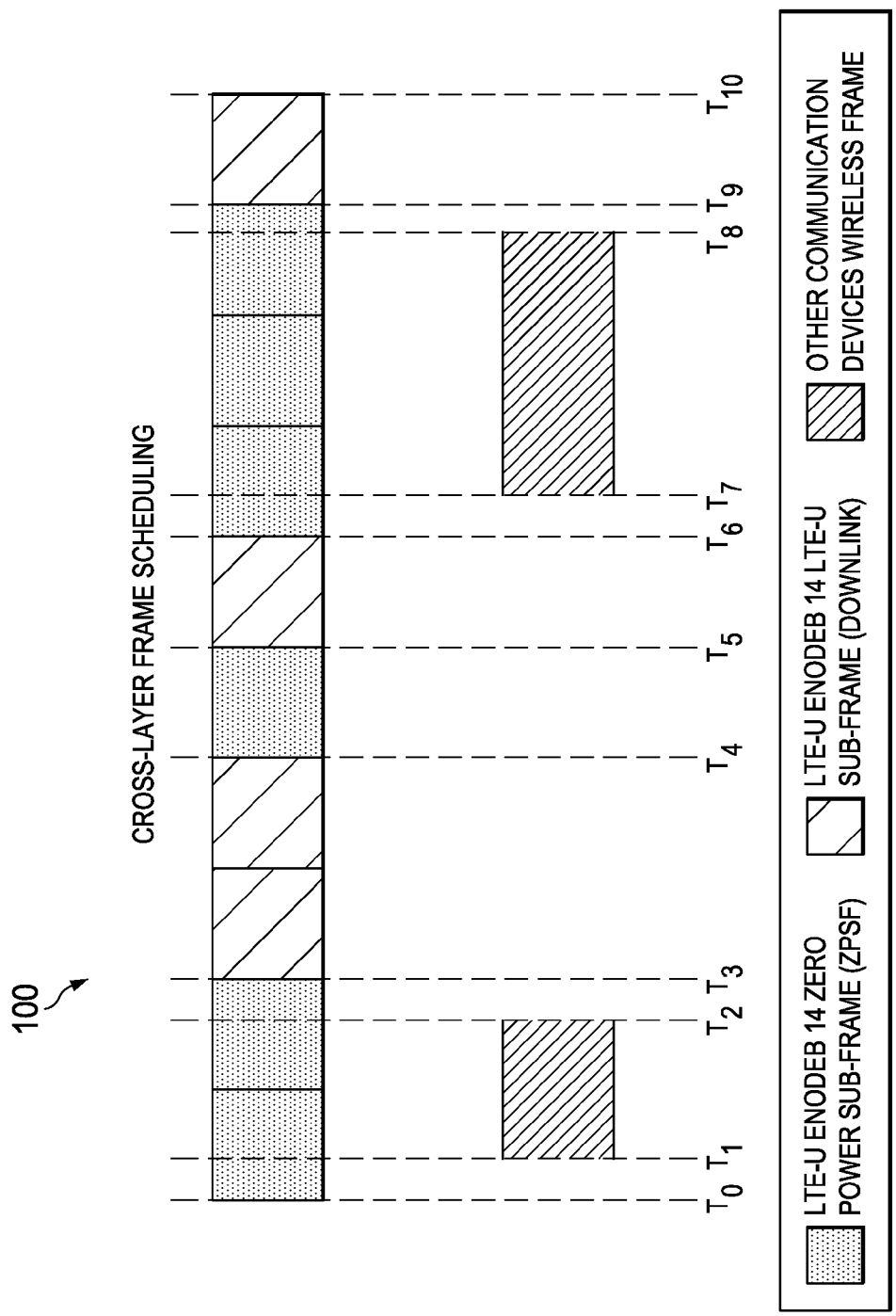
FIG. 1B is a simplified schematic diagram illustrating an example cross-layer frame scheduling flow in accordance with one potential embodiment of the present disclosure.

To illustrate features of communication system 10, consider FIG. 1B, which is a simplified schematic diagram 100 illustrating example cross-layer frame scheduling, which can be provided by LTE-U MAC scheduler 22a for times 'T$_0$' thru 'T$_{10}$' in accordance with one potential embodiment of the present disclosure, for a particular communication channel that may be used for communicating frames from LTE-U eNodeB 14 to UE 12a. As shown in FIG. 1B, the communication channel may be shared by LTE-U eNodeB 14 and one or more other communication devices (e.g., WAPs 42, 44 and/or neighboring LTE-U eNodeB 16) in communication system 10. Times T$_0$-T$_{10}$ are shown in FIG. 1B for illustrative purposes only and are not meant to limit the scope of the present disclosure. Note references may be made to LTE-U MAC scheduler 22a alone (as shown in FIG. 1A) for illustrating certain solutions provided by communication system 10, however, it should be understood that solutions and/or features described with regard to LTE-U MAC scheduler 22a can apply equally to any LTE-U MAC scheduler as described herein in this Specification such as LTE-U MAC scheduler 22b shown in FIG. 1A and/or LTE-U MAC scheduler 22c shown in FIG. 2, discussed in further detail below.

As illustrated in FIG. 1B, the frame schedule for LTE-U eNodeB 14 may include ZPSFs and LTE-U sub-frames for downlink frames for UE 12a. Also shown in FIG. 1B are wireless frames for other wireless communication devices, such as wireless radio access points 42, 44, and/or neighboring LTE-U communication devices such as LTE-U eNodeB 16.

During operation, for example, LTE-U MAC scheduler 22a, using wireless receiver 26a, can implement physical carrier sense for one or more other wireless communication devices/nodes in the system. Implementing physical carrier sense can include implementing Clear Channel Assessment (CCA) for one or more signal thresholds (e.g., to detect wireless preambles) and withholding LTE-U transmissions to UE 12a for signal strengths greater than a corresponding threshold. In various embodiments, the thresholds can include −62 dBm for detecting non WiFi signals down to −82 dBm for 20 MHz bandwidth WiFi. Equivalent thresholds can be set for alternative bandwidths as determined by a service provider or system operator. For example, as shown in FIG. 1B, LTE-U MAC scheduler 22a can withhold transmissions of LTE-U sub-frames between times $T_1$-$T_2$ and/or between times $T_7$-$T_8$ using physical carrier sense implemented via wireless receiver 26a, which may detect wireless frames from other wireless communication devices.

Upon determining that the channel is unoccupied, LTE-U MAC scheduler 22a, using wireless transmitter 24a, may transmit downlink frames (e.g., LTE-U sub-frames) to UE 12a, for example, at times $T_3$, $T_5$ and $T_9$.

As noted, LTE-U MAC scheduler 22a, using wireless receiver 26a, can also implement mechanisms to detect hidden nodes, which may help ensure that LTE-U eNodeB 14 can prevent wireless collisions in cases where a transmitter or receiver of another wireless communication device can be detected but not both. In various embodiments, mechanisms to detect hidden nodes can include decoding WiFi Request to Send (RTS) and CTS frames transmitted by other wireless communication devices in communication system 10. For example, LTE-U MAC scheduler 22a may detect WiFi RTS and/or CTS frames between times $T_0$-$T_1$ and/or between times $T_6$-$T_7$ in order to withhold transmitting LTE-U sub-frames to UE 12a, which may prevent collisions between hidden wireless nodes in the system (e.g., other LTE-U wireless communication devices and/or wireless APs, which may be present in the system).

LTE-U MAC scheduler 22a, using wireless receiver 26a, can also implement virtual carrier sense, which can be used to decode a Duration Field and network allocation vector (NAV) transmitted by one or more other wireless communication devices in communication system 10. Duration Field and NAV is typically used by wireless stations to reserve the medium (e.g., channel) for mandatory frames, which must follow a current frame. Thus, using virtual carrier sense prior to transmission may provide another mechanism for LTE-U MAC scheduler 22a to prevent collisions with other wireless communication devices in communication system 10. All WiFi frames can have Duration and NAV fields in the header of frames, and upon detection of any WiFi frame such as RTS, CTS, CTS-to-self or data frame, these fields can be retrieved from the MAC header.

In various embodiments, LTE-U MAC scheduler 22a can also enable other wireless receivers in communication system 10 to sense LTE transmissions (e.g., at lower sensitivity levels) by transmitting WiFi CTS-to-self frames with appropriate duration and NAV fields, based on transmit opportunity (TXOP), to help reduce channel collisions between LTE-U eNodeB 14 and other WiFi devices.

In various embodiments, LTE-U MAC scheduler 22a can also implement a random back-off mechanism, such as Distributed Coordination Function (DCF) and/or Enhanced Distributed Channel Access (EDCA), to ensure that it is sharing the medium (e.g., channel) fairly with other wireless users and other LTE-U eNodeBs. It is noteworthy that the issue of fairness is important even when there are only LTE-U eNodeBs sharing an unlicensed band. A back-off mechanism can ensure that several unlicensed users can share the channel fairly. Since LTE-U downlink frames typically carry several traffic streams to several LTE-U clients, the back-off mechanism may not address access category priority but instead may addresses channel access fairness between LTE-U eNodeBs and/or between LTE-U eNodeBs and other wireless (e.g., WiFi, Bluetooth™, WiMAX, etc.) devices.

Accordingly, LTE-U MAC scheduler 22a can perform physical carrier sensing, virtual carrier sensing and/or hidden node detection prior to transmission. Assuming that a medium is available (and, in certain embodiments, depending on a DCF and/or EDCA schedule), LTE-U MAC scheduler 22a using wireless transmitter 24a can notify other wireless receivers of an upcoming transmission and duration of the upcoming transmission.

The solution provided by communication system 10 may provide several advantages over using an unmodified LTE MAC scheduler for LTE-U transmissions. For example, implementing carrier sense and/or hidden node detection can reduce possible collisions between LTE-U transmissions and other wireless communication devices. Sending Quiet Frame information such as Duration Field and NAV (e.g., based on TXOP) can also be used to reduce channel collisions. Further, TXOP can also provide for implementing LTE Time Division Duplexing (LTE-TDD) by reserving sub-frames for uplink transmissions. Additionally, implementing back-off mechanisms based on communication environment feedback may be used to ensure multiple eNodeBs can co-exist under heavy loads since traditional Inter-cell Interference Coordination (ICIC) methods are unlikely to work in a multi-service provider environment.

Returning to FIG. 1A, in various embodiments, UE 12a-12d can be associated with users, employees, clients, customers, etc. wishing to initiate a flow in communication system 10 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within communication system 10. UE 12a-12d may also be inclusive of a suitable interface to a human user such as a microphone, a display, a keyboard, or other terminal equipment.

UE 12a-12d may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-12d may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

Wireless radio access points 42, 44 can offer suitable connectivity to UE using any appropriate protocol or technique. In general terms, wireless radio access points 42, 44 represent radio access point devices that can allow UE to connect to a wired network using WiFi, Bluetooth™, WiMAX, or any other appropriate standard. Hence, the broad term 'radio access point' can be inclusive of a hotspot, a WiFi array, a wireless bridge (e.g., between networks sharing same Service Set Identifier (SSID) and radio channel) or any other suitable access device, which may be capable of providing suitable connectivity to UE. In certain cases, the access point can connect to a router (via a wired network), which can relay data between the UE and other UE of the network.

As shown in FIG. 1A, LTE-U eNodeBs 14, 16 can each include a respective processor 46a-46b and a respective memory element 48a-4ab. Additionally, LTE-U eNodeB 14 can further include LTE MAC scheduler 20a and LTE-U MAC scheduler 22a, which can be configured with wireless transmitter 24a and wireless receiver 26a. LTE-U eNodeB 16 can further include LTE-U MAC scheduler 20b and LTE-U MAC scheduler 22b, which can be configured with wireless transmitter 24b and wireless receiver 26b. Hence, appropriate software and/or hardware is being provisioned in LTE-U eNodeBs 14, 16 in order to facilitate LTE-U MAC frame scheduling in the network environment. Note that in certain examples, certain databases can be consolidated with memory elements (or vice versa), or the storage can overlap/exist in any other suitable manner.

Figure 2:
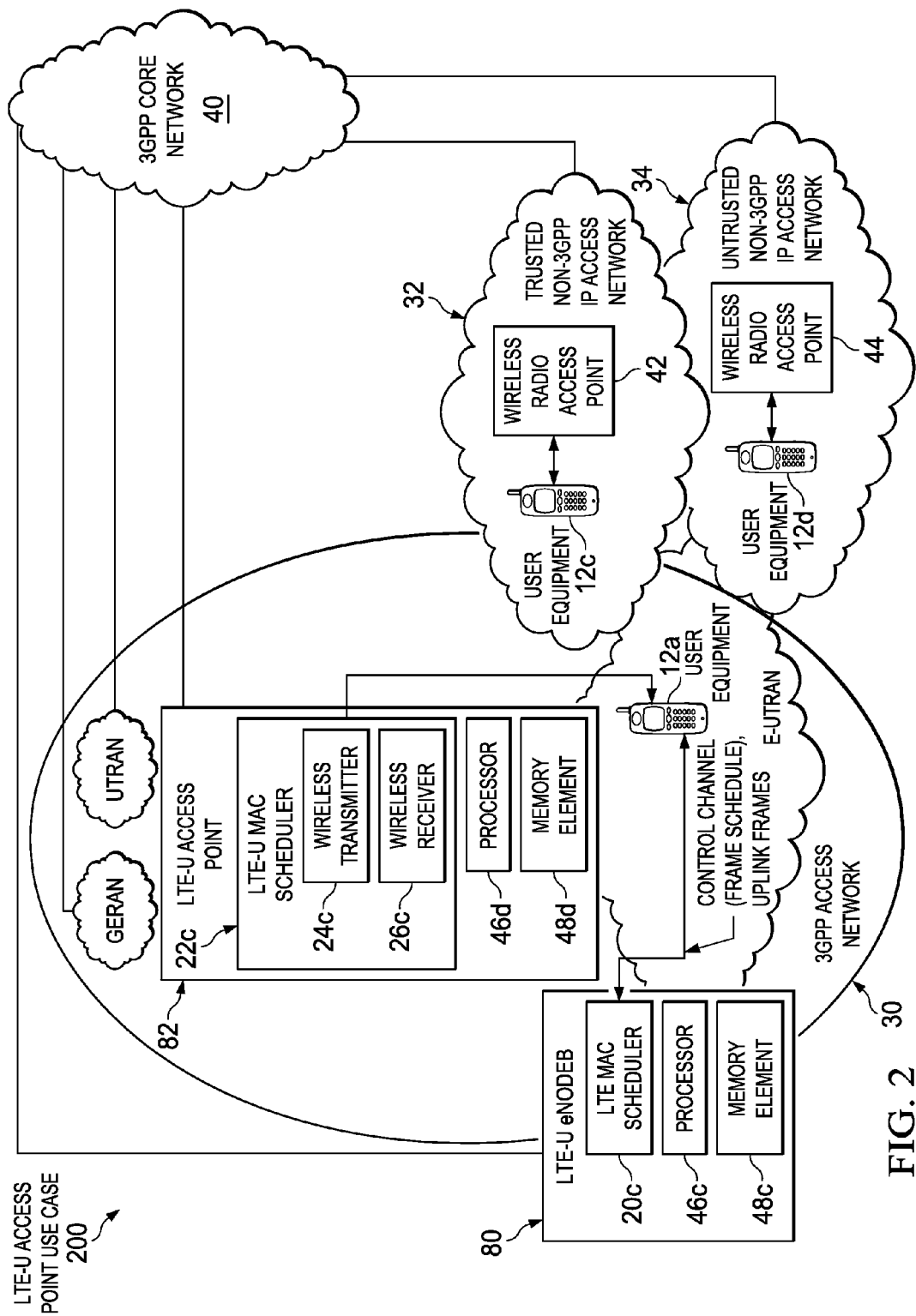
FIG. 2 is a simplified block diagram illustrating an LTE-U access point use case in accordance with one potential embodiment of the present disclosure.

In one example implementation, LTE-U eNodeBs 14, 16 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate LTE-U MAC frame scheduling activities (e.g., for networks such as those illustrated in FIG. 1A and in FIG. 2, described in further detail below). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of LTE-U eNodeB 14, 16 can include memory elements for storing information to be used in achieving the LTE-U MAC frame scheduling operations, as outlined herein. Additionally, each of these devices may include a processor that can execute software or an algorithm to perform LTE-U MAC frame scheduling activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to LTE-U eNodeBs 14, 16 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment (e.g., mobile nodes) can also include suitable interfaces for receiving, transmitting, and/or otherwise communicating data or information in a network environment.

Note that in certain example implementations, the LTE-U MAC frame scheduling functions as outlined herein may be implemented by logic encoded in one or more tangible media, which may be inclusive of non-transitory media (e.g., embedded logic provided in an ASIC, in DSP instructions, software [potentially inclusive of object code and source code] to be executed by a processor, or other similar machine, etc.). In some of these instances, memory elements [as shown in FIG. 1A and in FIG. 2, described in further detail below] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 1A and in FIG. 2, described in further detail below] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Referring to FIG. 2, FIG. 2 is a simplified block diagram is a simplified block diagram illustrating an LTE-U access point use case 200 in accordance with one potential embodiment of communication system 10. FIG. 2 includes 3GPP access network 30, which may include an LTE eNodeB 80 and an LTE-U access point (AP) 82. LTE eNodeB 80 may include an LTE MAC scheduler 20c, a processor 46c and a memory element 48c. LTE-U AP 82 may include LTE-U MAC scheduler 22c, which may be configured with a wireless transmitter 24c and a wireless receiver 26c. LTE-U AP 82 may also include a processor 46d and a memory element 48d. Also shown in FIG. 2 are trusted non-3GPP IP access network 32 including wireless radio access point 42 in communication with UE 12c and untrusted non-3GPP IP access network 34 including wireless radio access point 44 in communication with UE 12d. Additionally shown in FIG. 2 is 3GPP core network 40, which may interface with LTE eNodeB 80, LTE-U access point 82, the UTRAN, GERAN and trusted/untrusted IP access networks 32, 34.

The network elements shown in FIG. 2 may be largely similar to those shown in FIG. 1A, except that FIG. 2 illustrates that an LTE-U AP including an LTE-U MAC scheduler may be provided external to an LTE eNodeB. Thus, LTE-U sub-frames for UE 12a may be communicated from LTE-U AP 82 using LTE-U MAC scheduler 22c via wireless transmitter 24c. Scheduling the sub-frames may be performed using one or more mechanisms, as discussed above, such as physical carrier sense, virtual carrier sense and/or hidden node detection using wireless receiver 26c to reduce possible collisions prior to transmissions from LTE-U AP 82 via wireless transmitter 24c to UE 12a. Additionally, scheduling the sub-frames can be performed according to one or more random back-off mechanisms to reduce collisions and, using wireless transmitter 24c, LTE-U MAC scheduler 22c can notify one or more other wireless receivers of an upcoming transmission and duration of the upcoming transmission.

Thus, LTE-U AP 82 can perform similar functions as combined LTE-U eNodeB 14 for scheduling the transmission of LTE-U sub-frames, but as a stand-alone AP. Uplink frames for UE 12a may still be communicated to UE 12a using LTE MAC scheduler 20c. Further appropriate software and/or hardware can be provisioned in LTE-U AP 80 in order to facilitate LTE-U MAC frame scheduling in the network environment.

Figure 3:
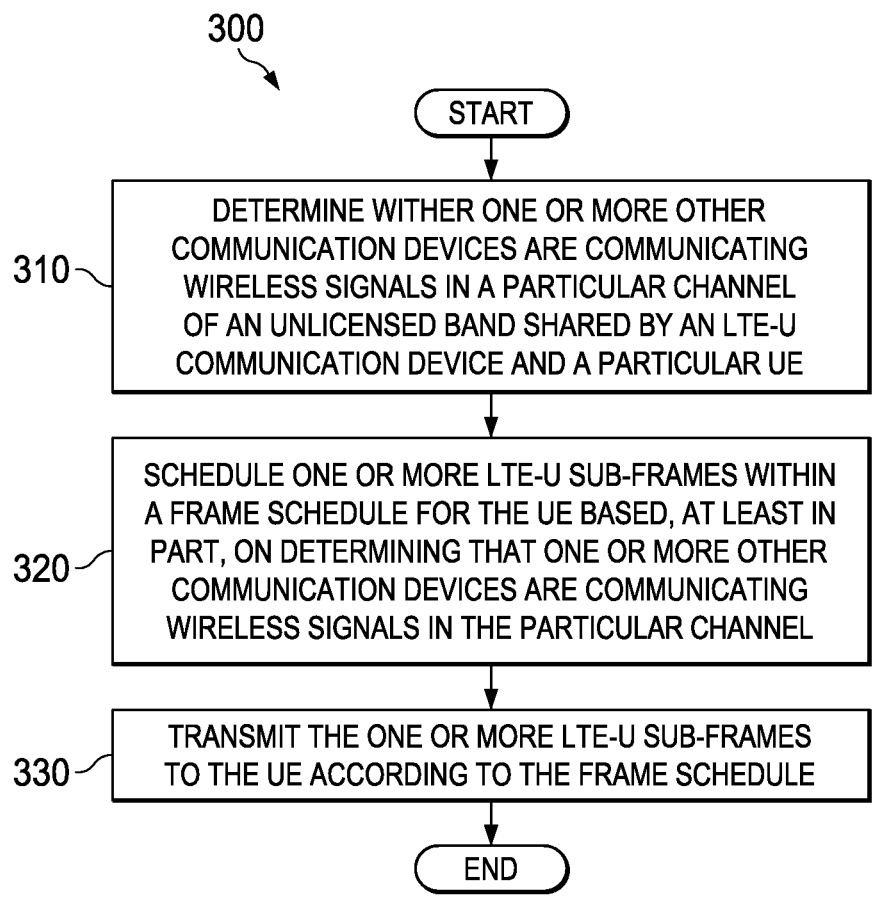
FIG. 3 is simplified flow diagram illustrating example operations associated with one embodiment of the present disclosure.

Referring to FIG. 3, FIG. 3 is a simplified flow diagram 300 illustrating example operations associated with LTE-U MAC frame scheduling in a network environment according to an embodiment. In one particular embodiment, these operations may be carried out by LTE-U eNodeB 14 via LTE-U MAC scheduler 22a configured with wireless transmitter 24a and wireless receiver 26a and/or LTE-U eNodeB 16 via LTE-U MAC scheduler 20b configured with wireless transmitter 24b and wireless receiver 26b. At any time, a given LTE-U MAC scheduler (e.g., LTE-U MAC scheduler 22a) may be used to communicate one or more LTE-U sub-frames to a given UE (e.g., UE 12a).

Thus, processing may start at 310 where LTE-U eNodeB 14 using LTE-U MAC scheduler 22a in conjunction with wireless receiver 26a may determine whether one or more other communication devices are communicating wireless signals in a particular channel of an unlicensed band shared by an LTE-U communication device (e.g., LTE-U eNodeB 14) and UE 12a. In various embodiments, the determining can include implementing, using wireless receiver 26a for LTE-U MAC scheduler 22a, physical carrier sense, virtual carrier sense and/or hidden node detection (e.g., decoding WiFi RTS and/or CTS frames communicated by one or more other communication devices). In various embodiments, the physical carrier sense can include a CCA at one or more signal strength thresholds for wireless signals (e.g., frames) communicated from the one or more other communication devices. In various embodiments, the virtual carrier sense can include decoding a Duration Field and NAV being transmitted by the one or more other communication devices.

At 320, LTE-U MAC scheduler 22a can schedule one or more LTE-U sub-frames within a frame schedule for UE 12a based, at least in part, on determining that one or more other communication devices are communicating wireless signals in the particular channel. In various embodiments, the LTE-U sub-frames may be downlink sub-frames for UE 12a. In various embodiments, LTE-U MAC scheduler 22a can schedule the one or more LTE-U sub-frames based additionally on one or more random back-off mechanisms such as DCF and/or EDCA, which may be implemented in LTE-U eNodeB 14. At 330, LTE-U MAC scheduler 22a, using wireless transmitter 24a, can transmit the one or more scheduled LTE-U sub-frames to UE 12a according to the frame schedule.

Figure 4:
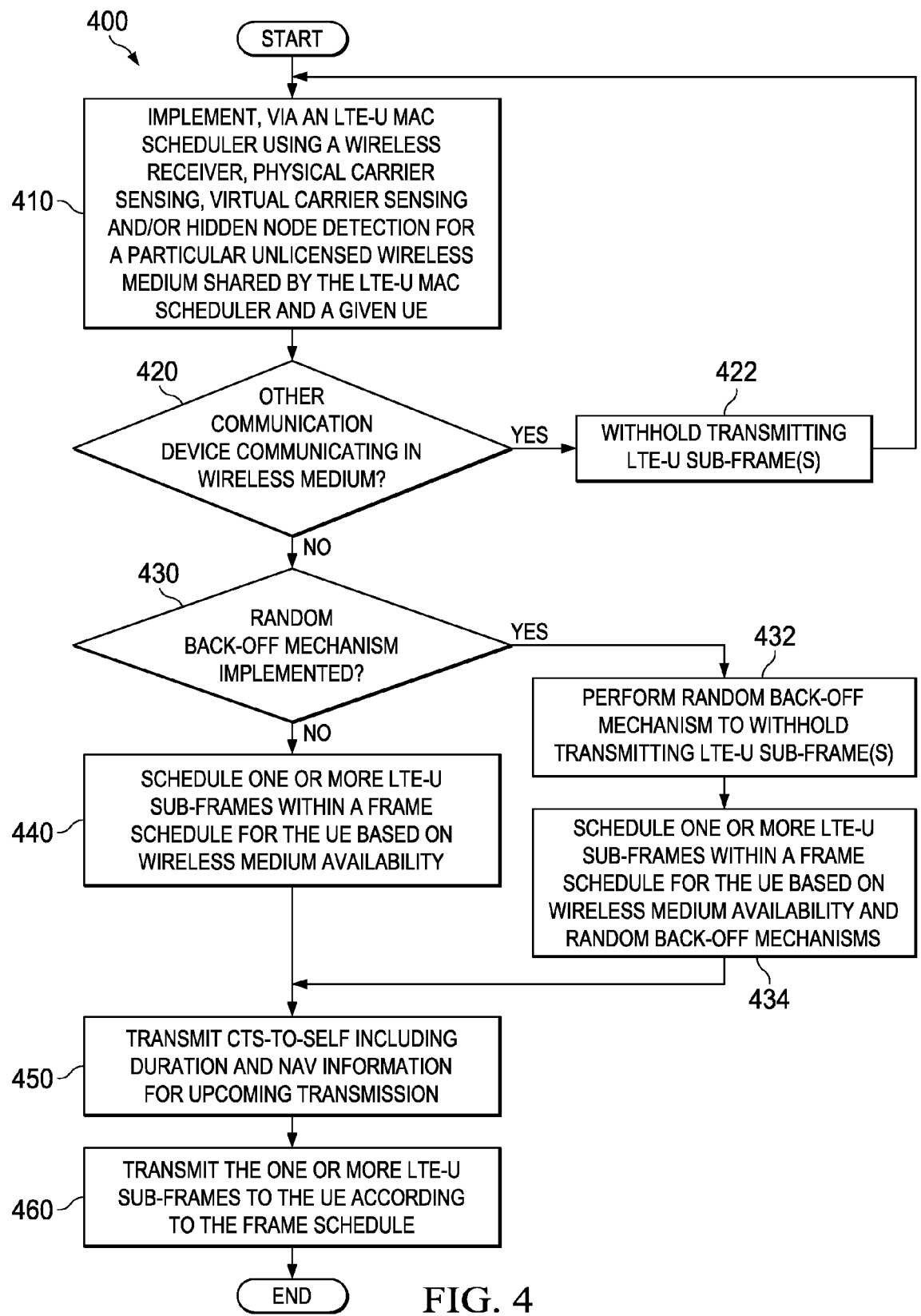
FIG. 4 is simplified flow diagram illustrating other example operations associated with one embodiment of the present disclosure.

Referring to FIG. 4, FIG. 4 is a simplified flow diagram 400 illustrating other example operations associated with LTE-U MAC frame scheduling in a network environment according to an embodiment. In one particular embodiment, these operations may be carried out by LTE-U eNodeB 14 via LTE-U MAC scheduler 22a configured with wireless transmitter 24a and wireless receiver 26a and/or LTE-U eNodeB 16 via LTE-U MAC scheduler 20b configured with wireless transmitter 24b and wireless receiver 26b. At any time, a given LTE-U MAC scheduler (e.g., LTE-U MAC scheduler 22a) may be used to communicate one or more LTE-U sub-frames to a given UE (e.g., UE 12a).

Thus, processing may start at 410 where LTE-U eNodeB 14 using LTE-U MAC scheduler 22a in conjunction with wireless receiver 26a may implement physical carrier sensing, virtual carrier sensing and/or hidden node detection for a particular unlicensed wireless medium (e.g., a particular wireless channel) shared by LTE-U MAC scheduler 22a and UE 12a. At 420, LTE-U MAC scheduler 22a may determine based, at least in part, on the carrier sensing and/or hidden node detection whether one or more other communication devices are communicating in the unlicensed wireless medium. If so, at 422 LTE-U MAC scheduler may withhold transmitting LTE-U sub-frame(s) to UE 12a and may continue to implement the carrier sensing and/or hidden node detection to determine when the wireless medium may become available.

If no other communication devices are determined to be communicating in the wireless medium (e.g., the medium is available for communications), then at 430 LTE-U MAC scheduler 22a may determine if any random back-off mechanisms are implemented, such as, for example EDCA and/or DCF. If no back-off mechanism is implemented, the LTE-U MAC scheduler may schedule one or more LTE-U sub-frames within a frame schedule for the UE based on the wireless medium availability at 440. At 450, LTE-U MAC scheduler 22a, using wireless transmitter 24a, may transmit CTS-to-self (e.g., WiFi CTS-to-self) frames with appropriate duration and NAV information for an upcoming transmission. At 460, LTE-U MAC scheduler 22a may transmit the one or more LTE-U sub-frames to the UE according to the frame schedule.

Returning to 430, if one or more random back-off mechanisms are implemented, at 432, LTE-U MAC scheduler 22a may perform a given random-back-off mechanism to withhold transmitting frames according to the back-off mechanism. At 434, LTE-U MAC scheduler 22a may schedule one or more LTE-U sub-frames within a frame schedule for the UE according to wireless medium availability and the one or more implemented random back-off mechanisms. At 450, LTE-U MAC scheduler 22a, using wireless transmitter 24a, may transmit CTS-to-self (e.g., WiFi CTS-to-self) frames with appropriate duration and NAV information for an upcoming transmission, and at 460, LTE-U MAC scheduler 22a may transmit the one or more LTE-U sub-frames to the UE according to the frame schedule.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding flows and activities have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words 'means for' or 'step for' are specifically used in the particular claims; and (b) does not intend, by any statement in the specification, to limit this disclosure in any way that is not otherwise reflected in the appended claims.

What is claimed is:

1. A method for a communication network comprising:
    determining, by a first communication device, whether one or more other communication devices are communicating wireless signals in a particular channel of an unlicensed band of the communication network;
    scheduling one or more Long Term Evolution Unlicensed (LTE-U) sub-frames within a frame schedule for a user equipment (UE) based, at least in part, on determining that one or more communication devices are communicating wireless signals in the particular channel, wherein the frame schedule comprises a plurality of zero-power sub-frames, each zero-power sub-frame being zero power for an entirety of the zero-power sub-frame; and
    communicating the one or more LTE-U sub-frames to the UE according to the frame schedule.

2. The method of claim 1, wherein the one or more LTE-U sub-frames are LTE-U downlink frames for the UE.

3. The method of claim 1, wherein the determining includes at least one of:
    implementing physical carrier sense by the first communication device to detect wireless signals being transmitted by one or more other communication devices;
    decoding, by the first communication device, Request to Send (RTS) and Clear to Send (CTS) frames being transmitted by one or more other communication devices; and
    implementing virtual carrier sense by the first communication device to detect wireless signals being communicated by one or more other communication devices.

4. The method of claim 3, wherein the determining is performed using a wireless receiver for a LTE-U Media Access Control (MAC) scheduler for the first communication device.

5. The method of claim 3, wherein the physical carrier sense includes a Clear Channel Assessment (CCA) at one or more signal strength thresholds.

6. The method of claim 3, wherein the virtual carrier sense includes decoding a Duration Field and a Network Allocation Vector being transmitted by the one or more other communication devices.

7. The method of claim 1, wherein the first communication devices is at least one of:
    an LTE-U evolved Node B (eNodeB) including an LTE-U Media Access Control (MAC) scheduler, wherein the LTE-U eNodeB includes a wireless receiver and a wireless transmitter for the LTE-U MAC scheduler and includes an LTE MAC scheduler; and
    an LTE-U Access Point (AP) including an LTE-U MAC scheduler, wherein the LTE-U AP includes a wireless receiver and a wireless transmitter for the LTE-U MAC scheduler.

8. The method of claim 1, further comprising:
    transmitting, by the first communication device, Clear to Send-to-self (CTS-to-self) frames including a Duration Field and Network Allocation Vector (NAV) based on transmit opportunity (TXOP) prior to communicating the one or more LTE-U sub-frames to the UE.

9. The method of claim 1, further comprising:
    implementing, by the first communication device, one or more random back-off mechanisms to prohibit communicating the one or more LTE-U sub-frames to the UE including at least one of:
    a distributed coordination function (DCF) back-off mechanism; and
    an enhanced distributed channel access (EDCA) back-off mechanism.

10. A non-transitory tangible media encoding logic that include instructions for execution that, when executed by a processor, is operable to perform operations comprising:
    determining, by a first communication device, whether one or more other communication devices are communicating wireless signals in a particular channel of an unlicensed band of a communication network;
    scheduling one or more Long Term Evolution Unlicensed (LTE-U) sub-frames within a frame schedule for a user equipment (UE) based, at least in part, on determining that one or more communication devices are communicating wireless signals in the particular channel, wherein the frame schedule comprises a plurality of zero-power sub-frames, each zero-power sub-frame being zero power for an entirety of the zero-power sub-frame; and
    communicating the one or more LTE-U sub-frames to the UE according to the frame schedule.

11. The media of claim 10, wherein the frame schedule further includes one or more zero-power sub-frames.

12. The media of claim 10, wherein the one or more LTE-U sub-frames are LTE-U downlink frames for the UE.

13. The media of claim 10, wherein the determining includes at least one of:
    implementing physical carrier sense by the first communication device to detect wireless signals being transmitted by one or more communication devices;

decoding, by the first communication device, Request to Send (RTS) and Clear to Send (CTS) frames being transmitted by one or more other communication devices; and implementing virtual carrier sense by the first communication device to detect wireless signals being communicated by one or more other communication devices.

14. The media of claim 13, wherein the physical carrier sense includes a Clear Channel Assessment (CCA) at one or more signal strength thresholds.

15. The media of claim 13, wherein the virtual carrier sense includes decoding a Duration Field and a Network Allocation Vector being transmitted by the one or more other communication devices.

16. The media of claim 10, the operations further comprising:

transmitting, by the first communication device, Clear to Send-to-self (CTS-to-self) frames including a corresponding Duration Field and Network Allocation Vector (NAV) based on transmit opportunity (TXOP) prior to communicating the one or more LTE-U sub-frames to the UE.

17. An apparatus, comprising:

a Long Term Evolution Unlicensed (LTE-U) Media Access Control (MAC) scheduler;

a memory element for storing data; and a processor that executes instructions associated with the data, wherein the processor and memory element cooperate such that the apparatus is configured for:

determining, by a first communication device, whether one or more other communication devices are communicating wireless signals in a particular channel of an unlicensed band of a communication network;

scheduling one or more LTE-U sub-frames within a frame schedule for a user equipment (UE) based, at least in part, on determining that one or more communication devices are communicating wireless signals in the particular channel, wherein the frame schedule comprises a plurality of zero-power sub-frames, each zero-power sub-frame being zero power for an entirety of the zero-power sub-frame; and communicating the one or more LTE-U sub-frames to the UE according to the frame schedule.

18. The apparatus of claim 17, wherein the determining includes at least one of:

implementing physical carrier sense by the first communication device to detect wireless signals being transmitted by one or more other communication devices;

decoding, by the first communication device, Request to Send (RTS) and Clear to Send (CTS) frames being transmitted by one or more other communication devices; and implementing virtual carrier sense by the first communication device to detect wireless signals being communicated by one or more other communication devices.

19. The apparatus of claim 17, wherein the first communication devices is at least one of:

an LTE-U evolved Node B (eNodeB) including the LTE-U MAC scheduler, wherein the LTE-U eNodeB includes a wireless receiver and a wireless transmitter for the LTE-U MAC scheduler and includes an LTE MAC scheduler; and an LTE-U Access Point (AP) including the LTE-U MAC scheduler, wherein the LTE-U AP includes a wireless receiver and a wireless transmitter for the LTE-U MAC scheduler.

* * * * *